(12) United States Patent
Inagaki et al.

(10) Patent No.: US 7,838,155 B2
(45) Date of Patent: Nov. 23, 2010

(54) AQUEOUS ELECTROLYTE SOLUTION ABSORBER AND METHOD FOR PRODUCING IT

(75) Inventors: Yasuhito Inagaki, Kanagawa (JP); Haruo Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1209 days.

(21) Appl. No.: 11/197,857

(22) Filed: Aug. 5, 2005

(65) Prior Publication Data

US 2006/0199079 A1    Sep. 7, 2006

Related U.S. Application Data

(62) Division of application No. 10/276,125, filed as application No. PCT/JP02/02382 on Mar. 13, 2002.

(30) Foreign Application Priority Data

| Mar. 13, 2001 | (JP) | ............................ P2001-071075 |
| Mar. 13, 2001 | (JP) | ............................ P2001-071076 |
| Mar. 13, 2001 | (JP) | ............................ P2001-071221 |
| Mar. 13, 2001 | (JP) | ............................ P2001-071223 |

(51) Int. Cl.
*H01M 8/14* (2006.01)

(52) U.S. Cl. ........................ 429/303; 429/347; 429/254; 521/64; 521/183; 521/271; 521/310; 604/358; 604/367; 604/368; 604/372; 604/378; 428/34.1; 428/34.3; 428/407; 428/402; 428/913

(58) Field of Classification Search ................ 429/303, 429/347, 254; 521/64, 183, 271, 310; 428/407, 428/402, 913
See application file for complete search history.

(56) References Cited

U.S. PATENT DOCUMENTS 3,888,256 A * 6/1975 Studinger ................... 604/368

(Continued)

FOREIGN PATENT DOCUMENTS

EP    0729834 A2    9/1996

(Continued)

OTHER PUBLICATIONS

European Search Report issued on Apr. 17, 2008 in connection with European Patent Application No. 2705151.5.

*Primary Examiner*—Patrick Ryan
*Assistant Examiner*—Ben Lewis
(74) *Attorney, Agent, or Firm*—SNR Denton US LLP

(57) ABSTRACT

The present invention relates to an aqueous electrolyte solution absorber including an aqueous electrolyte solution absorbent polymer obtained by introducing a hydrophilic polar group to a water insoluble polymer and a material to be sucked. The aqueous electrolyte solution absorber is produced by filling a water permeable bag type member with the aqueous electrolyte solution absorbent polymer obtained by introducing the hydrophilic polar group to the water insoluble polymer and a material to be sucked. The aqueous electrolyte solution absorber is inexpensive and has a high safety, a broad applicable range and a good handling property upon transportation or storage. Thus, a large amount of aqueous electrolyte solution absorbers can be rapidly conveyed at one time even to a risky place where persons are endangered to convey the absorbers.

6 Claims, 8 Drawing Sheets

U.S. PATENT DOCUMENTS

| | | | |
|---|---|---|---|
| 4,102,876 A | | 7/1978 | Brenner |
| 5,122,812 A | | 6/1992 | Hess et al. |
| 5,480,953 A | * | 1/1996 | Sugaya et al. ............... 526/320 |
| 5,780,167 A | | 7/1998 | Bottomley |
| 5,853,867 A | * | 12/1998 | Harada et al. ............ 428/317.9 |
| 2001/0007898 A1 | * | 7/2001 | Inagakai et al. ............. 528/154 |

FOREIGN PATENT DOCUMENTS

| | | |
|---|---|---|
| EP | 0818420 | 1/1998 |
| EP | 0818474 | 1/1998 |
| JP | 08-300662 | 11/1996 |
| JP | 10249193 | 9/1998 |
| JP | 2000-108355 | 4/2000 |
| SU | 517598 | 7/1976 |

* cited by examiner

AQUEOUS ELECTROLYTE SOLUTION ABSORBER AND METHOD FOR PRODUCING IT

The present application is a divisional of U.S. application Ser. No. 10/276,125, filed Nov. 13, 2002, which is a U.S. national phase application based on PCT/JP02/02382, filed Mar. 13, 2002, which claims the benefit of and priority to Japanese Application Nos. JP 2001-071223, JP 2001-071075, JP 2001-071076, JP 2001-071221, all filed Mar. 13, 2001. The contents of all these applications are incorporated herein by reference to the extent permitted by law. This application also claims the benefit of and priority to Japanese Application Nos. JP 2001-071223, JP 2001-071075, JP 2001-071076, JP 2001-071221, all filed Mar. 13, 2001.

TECHNICAL FIELD

The present invention relates to an absorber capable of absorbing various kinds of aqueous electrolyte solution and more particularly to an aqueous electrolyte solution absorber hardly getting out of shape upon its transportation or storage and a method for producing the absorber and further to a method for transporting the aqueous electrolyte solution absorber.

BACKGROUND OF THE INVENTION

Existing electrolyte solution absorbent polymers are ordinarily produced by adding cross-linking monomers to monomers having a solubility relative to electrolyte solution as an object and polymerizing the cross-linking monomers therewith. In this case, since most of monomers used as raw materials are relatively expensive, and the raw material monomers may partly remain in a product while they are not kept polymerized even after the polymerization, the monomers are inconvenient in respect of cost and safety.

Further, since the existing electrolyte solution absorbent polymers are merely designed and produced for absorbing only specific electrolyte solution as a target, the absorbing power of the polymers for certain kinds of electrolyte solutions out of the specific electrolyte solution is extremely deteriorated. However, in practice, since there exist greatly many cases in which a plurality of kinds of electrolyte solutions need to be simultaneously absorbed, the electrolyte solution absorbent polymers applicable to broad ranges are eagerly desired.

Further, in order to improve the handling property of the aqueous electrolyte solution absorber upon its transportation or storage, a more improvement is demanded so as to make the absorber hardly get out of shape during its transportation or storage.

As sandbags which are materials of construction for preventing the overflow of rivers, lakes and marshes, etc. in flood damages, for instance, linen bags filled with soil have been conventionally used. Since both the weight and volume of such sandbags are large, it has been difficult to convey them. Accordingly, the sandbags have been frequently conveyed one by one through the hands of persons in the site of a disaster or the like. Further, when the sandbags are conveyed from a remote place, the sandbags need to be conveyed by using vehicles and it takes labor to unload the sandbags. Thus, upon generation of a disaster, the water absorbers having the functions of the sandbags need to be rapidly applied to necessary positions at a necessary time, however, the sandbags have been prevented from being rapidly and sufficiently applied due to an inferior transportation property as described above. In addition, the sandbags cannot be inconveniently disposed on risky positions for the persons to convey the sandbags to.

Further, for water absorbers used for removing unnecessary water remaining due to water leakage or flood, etc., fibrous materials such as cloths have been employed. However, when a large amount of water needs to be removed because of the rupture of city water pipes due to the disaster of earthquake, etc., a large-scale flood in a broad area due to a flood damage or the water leakage from the tanks of a factory and so on, the same problems as those of the above-described sandbags have been generated.

Still further, when the sandbags are actually soaked in water, various kinds of electrolytes (sodium salts, phosphate salts, etc.) are eluted from the components of soil in the sandbags. In the water leakage from the factory, water containing electrolyte (aqueous electrolyte solution) may leak. However, since a conventional water absorbent polymer is low in its absorption magnification relative to the aqueous electrolyte solution, there has existed a problem that a performance as the absorber having a function of a sandbag or a function for removing the unnecessary water containing electrolytes cannot be completely achieved.

Furthermore, while, for the water absorbers used for removing unnecessary water remaining due to the water leakage or the flood, etc., fibrous materials such as cloths have been employed, the water absorbers are low in their absorption magnification relative to the aqueous electrolyte solution, the performances of the water absorbers cannot be inconveniently completely exhibited especially when a large amount of water containing electrolytes leaks from a factory.

Under the above-described circumstances, there has been eagerly desired an aqueous electrolyte solution absorber which effectively acts on electrolytes eluted from the components of soil in sandbags, sea water originally containing electrolytes or water leaking from a factory and is small in weight and volume and easily conveyed.

SUMMARY OF THE INVENTION

It is an object of the present invention to provide an aqueous electrolyte solution absorber which is inexpensive, high in its safety, applicable to a broad range and hardly loses shape upon its transportation or storage, and a method for producing it.

It is another object of the present to provide an aqueous electrolyte solution absorber especially useful for a substitute for a sandbag which is small in its weight and volume upon its transportation, and absorbs aqueous electrolyte solution upon its use to completely satisfy the weight and volume and a function of a form traceability for an outline.

It is a still another object of the present invention to provide a method for conveying an aqueous electrolyte solution absorber by which a large amount of electrolyte solution absorbers can be rapidly and simultaneously conveyed even to a risky place for persons to convey the aqueous electrolyte solution absorbers.

It is a further object of the present invention to contribute a global environment by utilizing, for instance, polymer wastes such as water insoluble polymers, or inorganic solid wastes such as metals or ceramics which have been hardly disposed as waste.

The inventors of the present invention earnestly and continuously studied for the purpose of achieving the above-described objects, so that they obtained a knowledge that an aqueous electrolyte solution absorbent polymer formed by introducing a hydrophilic polar group to a water insoluble polymer was used to obtain an aqueous electrolyte solution absorber having a high safety and a broad applicable range. Further, they recognized that used polymers or wastes were used especially as the water insoluble polymers for raw materials so that these materials could be effectively reused to contribute to the global environment and supply inexpensive products.

Further, as a result of study of losing shape of the aqueous electrolyte solution absorber upon its transportation or storage, the inventors had a knowledge that the absorber was provided with a supporter so that the absorber scarcely got out of shape during its transportation or storage. Especially, the inventors also obtained a knowledge that the aqueous electrolyte solution absorbent polymer was supported by the supporter to more prevent the absorber from getting out of shape during its transportation or storage.

Further, they obtained a knowledge that an aqueous electrolyte solution absorber having materials to be sucked as well as the aqueous electrolyte solution absorbent polymer provided in a water permeable bag type member was sucked and conveyed so that a large amount of absorbers could be rapidly and simultaneously conveyed without depending on a manual control. For instance, when a magnetic member is used as the material to be sucked, the aqueous electrolyte solution absorbers are magnetically sucked, so that a large amount of the absorbers can be rapidly conveyed at one time by a crane or a belt conveyor and further can be advantageously conveyed to a place where persons must face a danger.

Further, the inventors of the present invention found an advantage that, as the materials to be sucked, when the inorganic solid wastes such as the metals or the ceramics were made resources and employed, these materials could contribute to the global environment, since these materials were hardly treated in dismantling the parts of electronic devices.

In addition, they understood that the aqueous electrolyte solution absorbent polymer obtained by introducing the hydrophilic polar group to the water insoluble polymer was used to provide an electrolyte absorber whose weight and volume were small during its transportation and which absorbed water during its use to completely satisfy the weight and volume and a function of a form traceability of an outline. Further, the aqueous electrolyte solution absorber containing the aqueous electrolyte solution absorbent polymer advantageously and effectively acts on the electrolytes eluted from the components of soil in sandbags, sea water originally containing electrolytes or water leaking from a factory or the like. Furthermore, the aqueous electrolyte solution absorber also advantageously contributes to the global environment by making resources from the polymer wastes such as polymers which have been disposed as waste with difficulty and using the polymer wastes as the resources.

An aqueous electrolyte solution absorber according to the present invention includes an aqueous electrolyte solution absorbent polymer obtained by introducing a hydrophilic polar group to a water insoluble polymer. Here, as the hydrophilic polar group, are used at least one or more kinds of hydrophilic polar groups selected from a group having a sulfonic group which may form salts, a sulfate group which may form salts, a carboxyl group which may form salts, an amide group, a nitro group, a —$PO(OH)_2$ group which may form salts, a —$OPO(OH)_2$ group which may form salts, a hydroxyl group which may form salts, and an amine base which may form salts.

The hydrophilic polar group is set to 0.1 to 99 mole % based on total monomer units of the water insoluble polymer.

The water insoluble polymer includes at least one or more kinds of aromatic rings and/or conjugated dienes in a principal chain and/or a side chain. At least one or more kinds of aromatic rings and/or conjugated dienes of 1 to 100 mole % in the water insoluble polymer are included based on total monomer units of the water insoluble polymer.

The aqueous electrolyte solution absorber according to the present invention further includes a solid material of specific gravity not lower than 1. The solid material of specific gravity of 1 or higher is composed of any of natural mineral, waste, a material formed by binding waste, and waste having magnetism.

Further, the aqueous electrolyte solution absorber according to the present invention contains the aqueous electrolyte solution absorbent polymer obtained by introducing a hydrophilic polar group to a used water insoluble polymer. The hydrophilic polar group used herein includes at least one or more kinds of hydrophilic polar groups selected from a group having a sulfonic group which may form salts, a sulfate group which may form salts, a carboxyl group which may form salts, an amide group, a nitro group, a —$PO(OH)_2$ group which may form salts, a —$OPO(OH)_2$ group which may form salts, a hydroxyl group which may form salts, and an amine base which may form salts.

The hydrophilic polar group of 0.1 to 99 mole % is included based on total monomer units of the water insoluble polymer. The water insoluble polymer includes at least one or more kinds of aromatic rings and/or conjugated dienes in a principal chain and/or a side chain. At least one or more kinds of aromatic rings and/or conjugated dienes of 1 to 100 mole % in the water insoluble polymer are included based on total monomer units of the water insoluble polymer.

The aqueous electrolyte solution absorber according to the present invention further includes a solid material of specific gravity not lower than 1. The solid material of specific gravity not lower than 1 is composed of any of natural mineral, waste, a material formed by binding the waste, and waste having magnetism.

The present invention concerns a method for producing an aqueous electrolyte solution absorber comprising a step of placing, in a water permeable bag type member, an aqueous electrolyte solution absorbent polymer obtained by introducing a hydrophilic group to a water insoluble polymer. Here, the hydrophilic polar group includes at least one or more kinds of groups selected from a sulfonic group which may form salts, a sulfate group which may form salts, a carboxyl group which may form salts, an amide group, a nitro group, a —$PO(OH)_2$ group which may form salts, a —$OPO(OH)_2$ group which may form salts, a hydroxyl group which may form salts, and an amine base which may form salts. The hydrophilic polar group of 0.1 to 99 mole % is included based on total monomer units of the water insoluble polymer.

The water insoluble polymer includes at least one or more kinds of aromatic rings and/or conjugated dienes in a principal chain and/or a side chain. At least one or more kinds of aromatic rings and/or conjugated dienes of 1 to 100 mole % in the water insoluble polymer are included based on total monomer units of the water insoluble polymer.

In the method for producing an aqueous electrolyte solution absorber according to the present invention, a water permeable bag type member is filled with a solid material of specific gravity of 1 or higher.

The solid material of specific gravity not lower than 1 employed here is composed of any of natural mineral, waste, a material formed by binding waste, and waste having magnetism.

Further, the present invention relates to a method for producing an aqueous electrolyte solution absorber comprising a step of placing, in a water permeable bag type member, an aqueous electrolyte solution absorbent polymer obtained by introducing a hydrophilic group to a used water insoluble polymer. Here, the hydrophilic polar group includes at least one or more kinds of hydrophilic polar groups selected from a group having a sulfonic group which may form salts, a sulfate group which may form salts, a carboxyl group which may form salts, an amide group, a nitro group, a —$PO(OH)_2$ group which may form salts, a —$OPO(OH)_2$ group which may form salts, a hydroxyl group which may form salts, and an amine base which may form salts. The hydrophilic polar group of 0.1 to 99 mole % is included based on total monomer units of the water insoluble polymer.

The water insoluble polymer includes at least one or more kinds of aromatic rings and/or conjugated dienes in a principal chain and/or a side chain. At least one or more kinds of aromatic rings and/or conjugated dienes of 1 to 100 mole % in the water insoluble polymer are included based on total monomer units of the water insoluble polymer.

Further, in the method for producing an aqueous electrolyte solution absorber according to the present invention, a water permeable bag type member is filled with a solid material of specific gravity not lower than 1. The solid material of specific gravity not lower than 1 employed here is composed of any of natural mineral, waste, a material formed by binding waste, and waste having magnetism.

The present invention relates to an aqueous electrolyte solution absorber including an aqueous electrolyte solution absorbent polymer obtained by introducing a hydrophilic polar group to a water insoluble polymer and a supporter. As the supporter, a network member having a flexibility is used. The aqueous electrolyte solution absorbent polymer is supported by the supporter.

The aqueous electrolyte solution absorber includes a solid material of specific gravity not lower than 1. The solid material of specific gravity not lower than 1 is composed of waste having magnetism.

The aqueous electrolyte solution absorber according to the present invention includes an aqueous electrolyte solution absorbent polymer obtained by introducing a hydrophilic polar group to a used water insoluble polymer and a supporter. As the supporter, a network member having a flexibility is used. The aqueous electrolyte solution absorbent polymer is supported by the supporter.

The aqueous electrolyte solution absorber includes a solid material of specific gravity not lower than 1. The solid material of specific gravity not lower than 1 is composed of waste having magnetism.

The present invention concerns a method for producing an aqueous electrolyte solution absorber comprising a step of placing, in which a water permeable bag type member, an aqueous electrolyte solution absorbent polymer obtained by introducing a hydrophilic group to a water insoluble polymer and a supporter. As the supporter, a network member having a flexibility is used. The aqueous electrolyte solution absorbent polymer is supported by the supporter.

In the method for producing an aqueous electrolyte solution absorber according to the present invention, the water permeable bag type member is further filled with a solid material of specific gravity of 1 or higher. The solid material of specific gravity of 1 or higher is composed of waste having magnetism.

Further, the present invention concerns a method for producing an aqueous electrolyte solution absorber comprising a step of placing, in a water permeable bag type member, an aqueous electrolyte solution absorbent polymer obtained by introducing a hydrophilic group to a used water insoluble polymer and a supporter. As the supporter, a network member having a flexibility is employed.

In the method for producing an aqueous electrolyte solution absorber according to the present invention, further, the water permeable bag member is filled with a solid material of specific gravity of 1 or higher. The solid material of specific gravity 1 or higher is composed of waste having magnetism.

The present invention relates to an aqueous electrolyte solution absorber including an aqueous electrolyte solution absorbent polymer obtained by introducing a hydrophilic polar group to a water insoluble polymer and a material to be sucked. The material to be sucked is a magnetic material composed of waste or a material formed by binding waste.

The aqueous electrolyte solution absorber according to the present invention further includes a supporter. As the supporter, a network member having a flexibility is used. The aqueous electrolyte solution absorbent polymer is supported by the supporter.

Further, the aqueous electrolyte solution absorber according to the present invention includes an aqueous electrolyte solution absorbent polymer and a material to be sucked, the aqueous electrolyte solution absorbent polymer being obtained by introducing a hydrophilic polar group to a used water insoluble polymer. Here, the material to be sucked is a magnetic material.

The aqueous electrolyte solution absorber according to the present invention further includes a supporter. A network member having a flexibility is used for the supporter. The aqueous electrolyte solution absorbent polymer is supported by the supporter.

The present invention relates to a method for producing an aqueous electrolyte solution absorber comprising a step of placing, in a water permeable bag type member, an aqueous electrolyte solution absorbent polymer obtained by introducing a hydrophilic group to a water insoluble polymer and a material to be sucked. Here, the material to be sucked is a magnetic material.

In the method for producing an aqueous electrolyte solution absorber according to the present invention, the water permeable bag type member is further filled with a supporter. A network member having a flexibility is used for the supporter. The aqueous electrolyte solution absorbent polymer is supported by the supporter.

Further, the present invention relates to a method for producing an aqueous electrolyte solution absorber comprising a step of placing, in a water permeable bag type member, an aqueous electrolyte solution absorbent polymer obtained by introducing a hydrophilic group to a used water insoluble polymer and a material to be sucked. Here, the material to be sucked is a magnetic material.

In the method for producing an aqueous electrolyte solution absorber according to the present invention, the water permeable bag type member is further filled with a supporter. A network member having a flexibility is used for the supporter. The aqueous electrolyte solution absorbent polymer is supported by the supporter.

The present invention relates to a method for conveying an aqueous electrolyte solution absorber comprising a step of sucking the aqueous electrolyte solution absorber including an aqueous electrolyte solution absorbent polymer and a material to be sucked, the aqueous electrolyte solution absorbent polymer being obtained by introducing a hydrophilic polar group to a water insoluble polymer. The aqueous electrolyte solution absorber includes the aqueous electrolyte solution absorbent polymer and a magnetic material, the absorber being magnetically sucked; the aqueous electrolyte solution absorbent polymer being obtained by introducing the hydrophilic polar group to the water insoluble polymer.

The aqueous electrolyte solution absorber further includes a supporter. A network member having a flexibility is used for the supporter. The aqueous electrolyte solution absorbent polymer is supported by the supporter.

Further, a method for conveying an aqueous electrolyte solution absorber according to the present invention comprises a step of sucking the aqueous electrolyte solution absorber containing an aqueous electrolyte solution absorbent polymer a material to be sucked, the aqueous electrolyte solution absorbent polymer being obtained by introducing a hydrophilic polar group to a used water insoluble polymer. The aqueous electrolyte solution absorber includes the aqueous electrolyte solution absorbent polymer and a magnetic material, the absorber being magnetically sucked; the aqueous electrolyte solution absorbent polymer being obtained by introducing a hydrophilic polar group to a used water insoluble polymer.

The aqueous electrolyte solution absorber further includes a supporter. A network member having a flexibility is used for the supporter. The aqueous electrolyte solution absorbent polymer is supported by the supporter.

Still other objects of the present invention and specific advantages obtained by the present invention will be more apparent from the explanation of embodiments described by referring to the accompanying drawings.

DETAILED DESCRIPTION OF THE PRESENTLY PREFERRED EMODIMENTS

Figure 1:
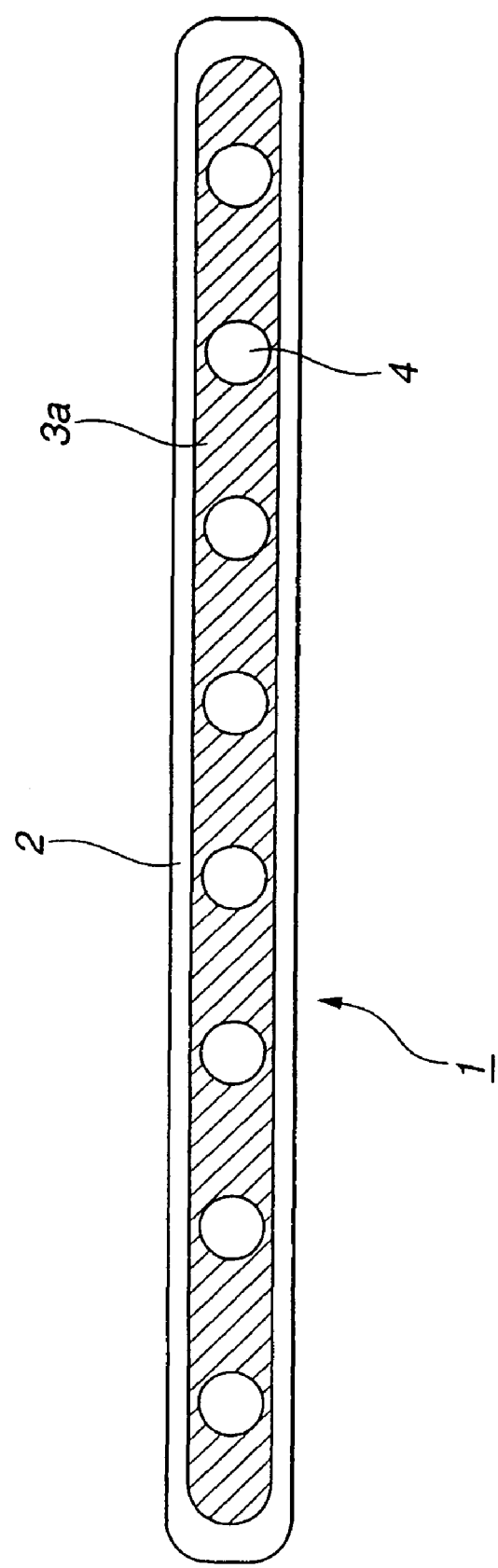
FIG. 1 is a sectional view of an aqueous electrolyte solution absorber according to the present invention when the absorber is dried.

Now, a first embodiment of the present invention will be described in detail by referring to the drawings.

Figure 2:
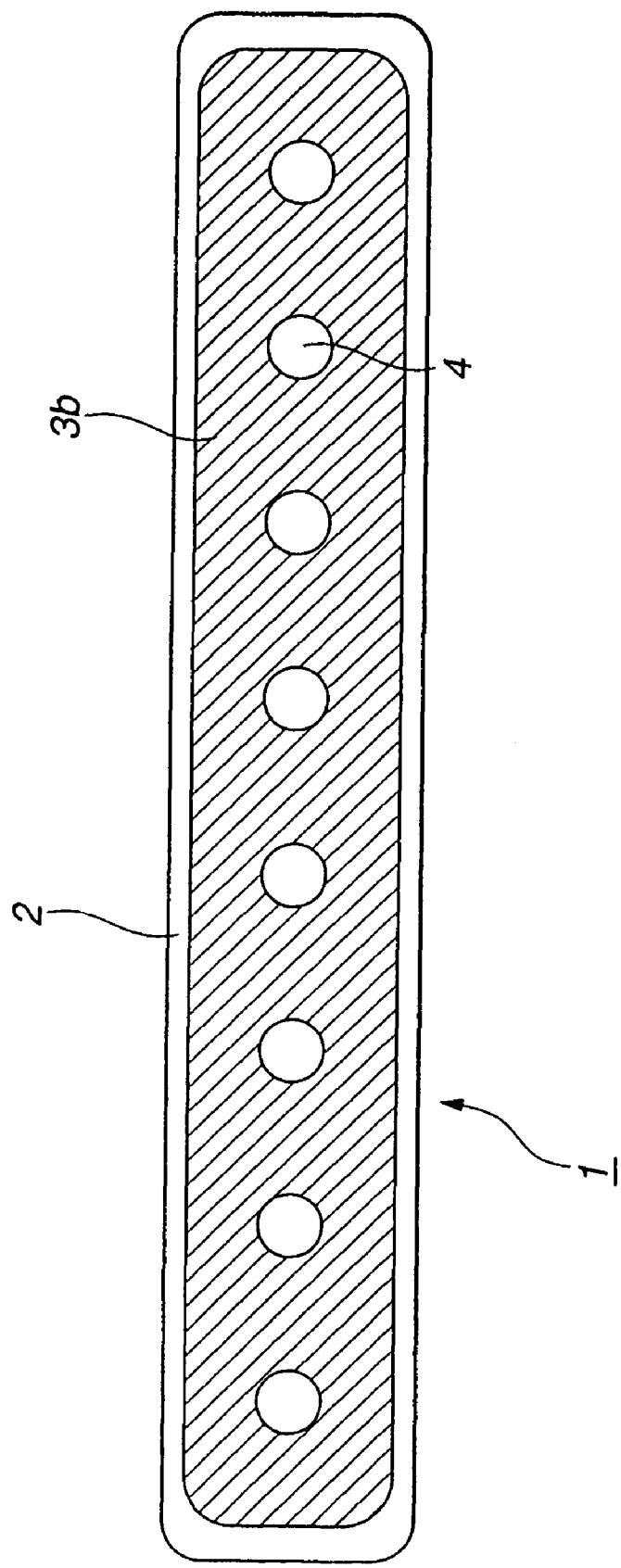
FIG. 2 is a sectional view of the aqueous electrolyte solution absorber according to the present invention when the absorber absorbs liquid to swell.

As an aqueous electrolyte solution absorber to which the present invention is applied, an aqueous electrolyte solution absorber 1 as shown in FIGS. 1 and 2 will be described below. As the "aqueous electrolyte solution absorber" described herein, there is exemplified a member having a function as a sandbag employed for raising an embankment or preventing the collapse of the embankment and restoring it in the overflow of the sea and rivers, or a member having a function for removing unnecessary water remaining in a water leakage or a flood and so on.

The aqueous electrolyte solution absorber 1 according to the present invention is provided with a water permeable bag type member 2 and aqueous electrolyte solution absorbent polymers 3a and 3b contained in the water permeable bag type member 2. The aqueous electrolyte solution absorber 1 comprises, in its dried state, the aqueous electrolyte solution absorbent polymer 3a under a dried state and the water permeable bag type member 2 as shown in the sectional view of FIG. 1, and, comprises in its liquid absorbing and swelling state, the aqueous electrolyte solution absorbent polymer 3b and the water permeable bag type member 2 under the liquid absorbing and swelling state as shown in the sectional view of FIG. 2. Further, reference numeral 4 in FIGS. 1 and 2 designates soil or solid materials of specific gravity of 1 or higher except the soil.

The aqueous electrolyte solution absorbent polymer used in the present invention is ordinarily produced by introducing a hydrophilic group to a water insoluble polymer. The aqueous electrolyte solution absorbent polymer used as a raw material is not especially limited to any specific raw material. However, the water insoluble polymer obtained from inexpensive commodity monomers is preferably employed as the raw material. As such commodity water insoluble polymers, there are specifically exemplified the following polymers. For example, there may be enumerated ABS (acrylonitrile-butadiene-styrene) polymer, high impact polystyrene (HIPS), styrene-butadiene elastomer (SBC), SAN (styrene-acrylonitrile) polymer, polyacrylonitrile polymer (PAN), polyacrylonitrile-butadiene (nitrile rubber), polystyrene (PS), nylon polymer, polyolefine (for instance, polyethylene, polypropylene, polyisoprene, etc.) polymer, polyvinyl chloride (PVC), polyphenylene ether (PPE), polyphenylene sulfide (PPS), polycarbonate (PC), polyethylene terephthalate (PET), polybutylene terephthalate (PBT), polysulfone, polyallyl sulfone, polyether sulfone, polythioether sulfone, polyether ketone, polyether imide, polyether ether ketone, polyamide (nylon), polyamide imide, polyimide, polyallylate, aromatic polyester, polyurethane, polyvinyl chloride, chlorinated polyether, polychloromethylstyrene, polyacrylic ester, polymethacrylate ester, celluloid, various kinds of liquid crystal polymers, methacrylate polymer (PMMA), succinate polymer, terpene polymer, epoxy polymer, phenol formalin polymer, melamine polymer, etc.

As the aqueous electrolyte solution absorbent polymer used as the raw material, such materials having aromatic ring or conjugated diene structures as mentioned below to which a hydrophilic polar group is easily introduced may be preferably employed among the above-described polymers. The content of the aromatic ring and/or conjugated diene units in the water insoluble polymer is desirably located within a range of about 1 to 100 mole % based on total monomer units of the water insoluble polymer. In order to prevent the number of hydrophilic polar groups introduced into the water insoluble polymer from decreasing so that an absorption effect to aqueous electrolyte solution is deteriorated, the above-described content is preferably about 1 mole % or higher.

The molecular weight (Mw) of the water insoluble polymer material is not especially limited to any specific value. However, weight average molecular weight (Mw) of about 1,000 to 20,000,000, and further of about 10,000 to 1,000,000 is ordinarily specified. When the molecular weight is higher than 1,000, an inconvenience that the water insoluble polymer material is completely dissolved in the aqueous electrolyte solution by introducing the hydrophilic polar group thereto so that the state of gel cannot be maintained after the absorption of the solution can be avoided. When the molecular weight is lower than 20,000,000, the introduction of the hydrophilic polar group is made more easily to improve a practicality.

These water insoluble polymers may be newly produced and unused granular polymers (virgin pellets) or used water insoluble polymers formed for the purpose of a specific use or wastes. As the wastes, there are exemplified, for example, waste products (incomplete products) in the process of production of resin materials or molded products, casings or various kinds of parts materials which have been already used for electric products, motor vehicles, etc. or tubes or hoses, various kinds of cushioning materials, etc. The used water insoluble polymers mean water insoluble polymers recovered from the above-mentioned wastes, etc. Places where the wastes are provided may be any of factories, shops, homes, etc. Since most of the wastes (for instance, incomplete products, or the like) recovered from the factories or the shops have compositions relatively more uniform than general waste from the homes or the like, they are more desirable.

Further, the water insoluble polymers may be alloy materials with other polymers, the wastes including addition agents such as a pigment, a stabilizer, a flame retarder, a plasticizer, a filler, a curing type adhesive, other adjuvants, or used water insoluble polymers. Further, the water insoluble polymer may be a mixture of the used water insoluble polymer or the waste and virgin materials.

The present invention is designed to convert the water insoluble polymer to the aqueous electrolyte solution absorbent polymer by introducing a hydrophilic polar group to the water insoluble polymer. At this time, the hydrophilic polar group has an effect for increasing an absorptivity to the aqueous electrolyte solution. On the other hand, hydrophobic parts in the water insoluble polymer (principal chains, aromatic rings and parts to which the hydrophilic polar groups are not introduced) have effects for preventing the water insoluble polymer from being dissolved in various types of aqueous electrolyte solutions.

As the hydrophilic polar groups, there may be exemplified polar groups such as acidic groups, basic groups, etc. The acidic groups or the basic groups may form salts. As these hydrophilic groups, there may be specifically enumerated a sulfonic group which may form salts expressed by a formula —$SO_3M$ (in the formula, M designates a hydrogen atom or cation of metal such as sodium, potassium, etc.), a sulfate group which may form salts expressed by a formula —$OSO_3M$ (in the formula, M designates the same meaning as the above), a phospho group which may form salts expressed by a formula —$PO(OM_1)(OM_2)$ or a formula —$OPO(OM_1)(OM_2)$ (in the formulas, $M_1$ and $M_2$ are the same or different from each other and have the same meaning as the above-described M), a hydroxyl group which may form salts expressed by a formula —$OM_3$ (in the formula, $M_3$ has the same meaning as the above-described M), a carboxyl group which may form salts expressed by a formula —$COOM_4$ (in the formula, $M_4$ designates the same meaning as the above-described M) as the acidic groups which may form salts. Further, as the basic groups which may form salts, there may be exemplified an amine base which may form salts such as an amino group, a secondary amino group (for instance, a methyl amino group), a tertiary amino group (for instance, dimethyl amino group), a quaternary ammonium group (for instance, trimethyl ammonium chloride group) etc. As other hydrophilic polar groups, there are exemplified an amide group, a nitro group, etc.

As for a method for introducing a sulfonic group and/or a sulfonic group which forms a salt to the water insoluble polymer, the water insoluble polymer having aromatic rings is preferably made to directly react with a sulfonation agent such as concentrated sulfuric acid (the sulfuric acid of about 70 wt % or higher is more preferable), sulfuric anhydride, fuming sulfuric acid, chlorosulfonic acid, or the water insoluble polymer is made to react with the sulfonation agent while the polymer is dissolved or dispersed in an organic solvent to introduce the sulfonic group thereto, and the obtained material is subsequently neutralized by a basic compound (for instance, sodium hydroxide, potassium hydroxide, etc.) to be converted into sulfonate. Reaction temperature upon introducing the sulfonic group to the polymer is greatly different depending on whether or not the organic solvent is used. The reaction temperature is generally located within a range of about 0° C. to 200° C. and preferably within a range of about 30° C. to 120° C. When the reaction temperature is about 0° C. or higher, reaction speed is sufficiently accelerated to obtain an aqueous electrolyte solution absorbent polymer having a better performance. Further, when the reaction temperature is not higher than about 200° C., molecular chains in the polymer are hardly cut and rarely dissolved in water or a solvent, so that the above-described range is preferable. Reaction time is greatly different depending on the reaction temperature and generally 1 minute to 40 hours, and preferably, 5 minutes to 2 hours. This condition is preferable since a reaction is more satisfactorily advanced to obtain a good productive efficiency.

As for a method for introducing a sulfate group which may form salts to the water insoluble polymer, preferably, the water insoluble polymer having unsaturated bonds is firstly made to react with aqueous sulfuric acid solution of high temperature to first introduce the sulfate group thereto, and then, the obtained material is made to react with a basic compound (for instance, sodium hydroxide, potassium hydroxide, etc.) to obtain sulfate.

As for a method for introducing a carboxyl group which may form salts to the water insoluble polymer, preferably, n-butyl lithium is added to the water insoluble polymer having aromatic rings, and then, the obtained material is made to react with dry ice to introduce the carboxyl group thereto. Then, the obtained material is made to react with a basic compound (for instance, sodium hydroxide, potassium hydroxide, etc.) to obtain carboxylate.

As for a method for introducing an amide group to the water insoluble polymer, for instance, the water insoluble polymer having a nitrile group is hydrolyzed by heated concentrated sulfuric acid or heated alkali (for instance, aqueous sodium hydroxide solution, aqueous potassium hydroxide solution, etc.) so that the amide group can be introduced.

As for a method for introducing a nitro group to the water insoluble polymer, the water insoluble polymer having aromatic rings is preferably made to react with the mixed solution of fuming nitric acid or nitric acid and sulfuric acid so that the nitro group can be introduced.

As for a method for introducing a —$PO(OH)_2$ group which may form salts to the water insoluble polymer, phosphorus trichloride is added to the water insoluble polymer having aromatic rings and then hydrolyzed to firstly introduce the —$PO(OH)_2$ group thereto, and then, the obtained material is made to react with a basic compound (for instance, sodium hydroxide, potassium hydroxide, etc.) to obtain a salt of the —$PO(OH)_2$ group.

As for a method for introducing a —OPO(OH)$_2$ group which may form salts to the water insoluble polymer, phosphorus trichloride is preferably added to the water insoluble polymer having unsaturated bonds and then hydrolyzed to firstly introduce the —OPO(OH)$_2$ group thereto, and then, the obtained material is allowed to react with a basic compound (for instance, sodium hydroxide, potassium hydroxide, etc.) so that a salt of the —OPO(OH)$_2$ group can be obtained.

As for a method for introducing a hydroxyl group which may form salts to the water insoluble polymer, the water insoluble polymer having unsaturated bonds is preferably made to react with aqueous sulfuric acid solution to firstly introduce the hydroxyl group thereto, and then, the obtained material is made to react with a basic compound (for instance, sodium hydroxide, potassium hydroxide, etc.) so that a salt of the hydroxyl group can be obtained.

As for a method for introducing tertiary and/or quaternary amine bases to the water insoluble polymer, the water insoluble polymer having aromatic rings is preferably chloromethylated in accordance with the Friedel-Crafts reaction, and then, the obtained product is made to react with ammonia or various kinds of amine compounds so that tertiary or quaternary amine salts can be introduced as ionic groups. The introduction of a primary amino group or a secondary amino group or the conversion of these amino groups into salts may be carried out by well-known methods.

The hydrophilic polar group introducing agents or the basic compounds may be virgin agents, waste liquid exhausted from factories, or regenerated products. The waste liquid is more preferably used for producing the aqueous electrolyte solution absorbent polymer employed in the present invention from the viewpoint of effective use of resources.

Only one kind of these hydrophilic polar groups may be introduced to the water insoluble polymer or two or more kinds of them may be introduced thereto. Further, the amount of these hydrophilic polar groups introduced to the water insoluble polymer is desirably located within a range of about 0.1 to 99 mole % based on total monomer units in the polymer. To suppress the dissolution of the polymer to which the hydrophilic polar groups are introduced in water and to improve an absorptivity to the aqueous electrolyte solution, the above-described range is preferable.

A well-known process may be further applied to the aqueous electrolyte solution absorbent polymer obtained by the above-described methods. According to a preferred embodiment, a reaction product which is ordinarily a gel material obtained by the above-described introduction and reaction of the hydrophilic polar group is preferably filtered, rinsed, and then dried or dehydrated, so that a polymer having various kinds of excellent absorbing powers can be obtained.

Further, it is to be understood that the aqueous electrolyte solution absorbent polymer of the present invention may be produced by polymerizing monomers to which the hydrophilic polar groups are introduced with principal chains and/or side chains by well-known means.

To the aqueous electrolyte solution absorbent polymer used in the present invention, may be further blended other component, for instance, a conventionally well-known aqueous electrolyte solution absorbent polymer (for instance, a material obtained by adding and polymerizing a cross-linking monomer), a stabilizer, a moisture absorbent, a curing type adhesive, etc. as desired.

A polymer capable of various kinds of aqueous electrolyte solutions with high concentration can be obtained by preferably introducing the hydrophilic polar group to the water insoluble polymer in accordance with the above-described method, no matter which method may be used.

As aqueous electrolyte solutions which can be absorbed by the aqueous electrolyte solution absorbent polymer thus obtained, there may be exemplified, various kinds of inorganic salt compounds or organic salt compounds, inorganic acid or inorganic bases, and organic acid or organic bases. More specifically, sea water, waste water, muddy water, etc may be enumerated. The aqueous electrolyte solution absorber according to the present invention has a more effective absorbing power for the aqueous electrolyte solution including sodium salt, calcium salt, magnesium salt, etc. especially contained in soil or sea water.

When the aqueous electrolyte solution is absorbed by the aqueous electrolyte solution absorber according to the present invention, the aqueous electrolyte solution may be in any of states of gas, liquid and solid with no trouble. When the aqueous electrolyte solution is in a state of liquid, the aqueous electrolyte solution absorbent polymer is directly added to the aqueous electrolyte solution to absorb the aqueous electrolyte solution. When the aqueous electrolyte solution is in a state of gas, the polymer is made to come into contact with liquefied or gaseous electrolyte solution so that the aqueous electrolyte solution can be absorbed. Further, when the aqueous electrolyte solution is in a state of solid, the aqueous electrolyte solution dissolved in other aqueous electrolyte solution can be absorbed by the absorber. The aqueous electrolyte solution is more preferably in a state of liquid.

As a material for the water permeable bag type member 2, a cloth composed of natural fibers or synthetic fibers is used. As the natural fibers, for instance, cotton, linen, silk, etc. may be exemplified. As the synthetic fibers, there may be exemplified, polyamide, polyimide, polyester, polyethylene, polypropylene, etc. The material is preferably formed by independently knitting or weaving these fibers or the mixture of them. However, according to circumstances, the material may be made of a nonwoven fabric. Further, according to circumstances, the material may be composed of a film type member having pores passing through the front and back thereof.

In the present invention, soil and/or solid materials of specific gravity of 1 or higher can be included in the water permeable bag type member except the aqueous electrolyte solution absorbent polymer. Thus, the aqueous electrolyte solution absorber according to the present invention has an advantage that the absorber is hardly made to flow by water or the like especially during the initial stage of its installation.

As the solid materials of specific gravity of 1 or higher, there may be exemplified a solid material made of natural minerals, a solid material made of waste and a solid material formed by binding the waste. As materials of them, there are exemplified plastic, metal, ceramics, glass, or the mixture of them. For binding them, polymer materials of specific gravity of 1 or lower can be used. The polymer materials used for binding are not especially limited to specific materials. There are enumerated, for example, polystyrene, styrene-propylene copolymer, styrene-butadiene copolymer, styrene-vinyl chloride copolymer, styrene-vinyl acetate copolymer, styrene-acrylic ester copolymer, styrene-methacrylic ester copolymer, polyester resin, polyvinyl alcohol, water soluble resins such as casein, sodium polyacrylate etc., alcohol soluble resins such as copolymer nylon, methoxymethylated nylon etc., curing type resins forming a three-dimensional network structure such as polyurethane, melamine resin, epoxy resin, etc.

In the present invention, as the solid materials of specific gravity of 1 or higher, materials having magnetism can be used. The aqueous electrolyte solution absorber according to the present invention can be magnetically attracted and advantageously moved and transported by a crane or the like due to this magnetism. Further, the aqueous electrolyte solution absorber can be identified due to the magnetism.

As the materials having the magnetism, there may be exemplified materials having ferrimagnetism, ferromagnetism or parasitic magnetism. More specifically, as the ferromagnetic materials, there may be exemplified iron, nickel, cobalt or alloys of them, alloys including them, transition metals or alloys of them, and alloys including rare earth elements. Further, the ferrimagnetic materials include magnetite, maghemite, hematite, manganese zinc ferrite, manganese nickel ferrite, barium ferrite, strontium ferrite, etc. These materials may be composed of natural minerals, waste or materials formed by binding the waste. These materials have specific gravity higher than those of ordinary inorganic materials to increase the weight of the aqueous electrolyte solution absorber, so that even the aqueous electrolyte solution absorber which absorbs liquid can effectively and relatively increase its weight. Further, these materials can be obtained from inductor elements or speakers of used electric devices, or the deflection yokes of televisions. Since these members are hardly treated in the dismantling step of electronic devices, they are serviceable in view of effective use of them.

Consequently, since the aqueous electrolyte solution absorber according to the present invention can be applied not only to deionized water but also to water including electrolytes such as sea water, waste water, muddy water, etc., the absorber of the present invention can be applied to the raising an embankment in the seaside or the prevention and restoration of the collapse of the embankment, or to the water leakage from factories, especially, to the water leakage from tanks for storing aqueous electrolyte solution in the factories belonging to the field of a battery or plating industry. Further, the aqueous electrolyte solution absorber of the present invention has a liquid absorptivity higher than that of a conventional aqueous electrolyte solution absorber and can adequately meet an instance in which a large amount of aqueous electrolyte solution needs to be absorbed or an instance in which the solution needs to be rapidly absorbed.

Further, the aqueous electrolyte solution absorber according to the present invention is low both in weight and volume upon its transportation and absorbs water upon its use so that the absorber of the present invention adequately satisfies a function of a form followability for its weight, volume and outline.

Since the aqueous electrolyte solution absorber according to the present invention can be manufactured by employing used polymers or wastes, and also manufactured by using contained solid materials of specific gravity of 1 or higher and members hardly treated in a dismantling step of electronic devices, as desired, these wastes or the like can be effectively reused and accordingly, the absorber of the present invention can advantageously contribute to a global environment.

Figure 3:
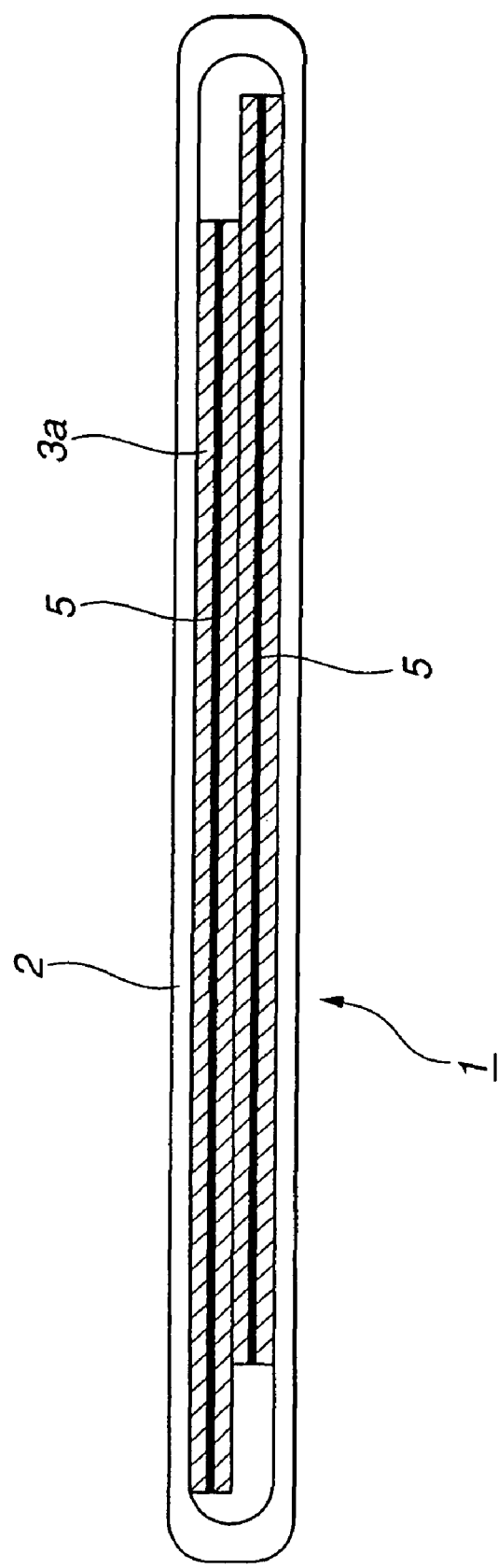
FIG. 3 is a sectional view of an aqueous electrolyte solution absorber according to the present invention when the absorber is dried.
Figure 4:
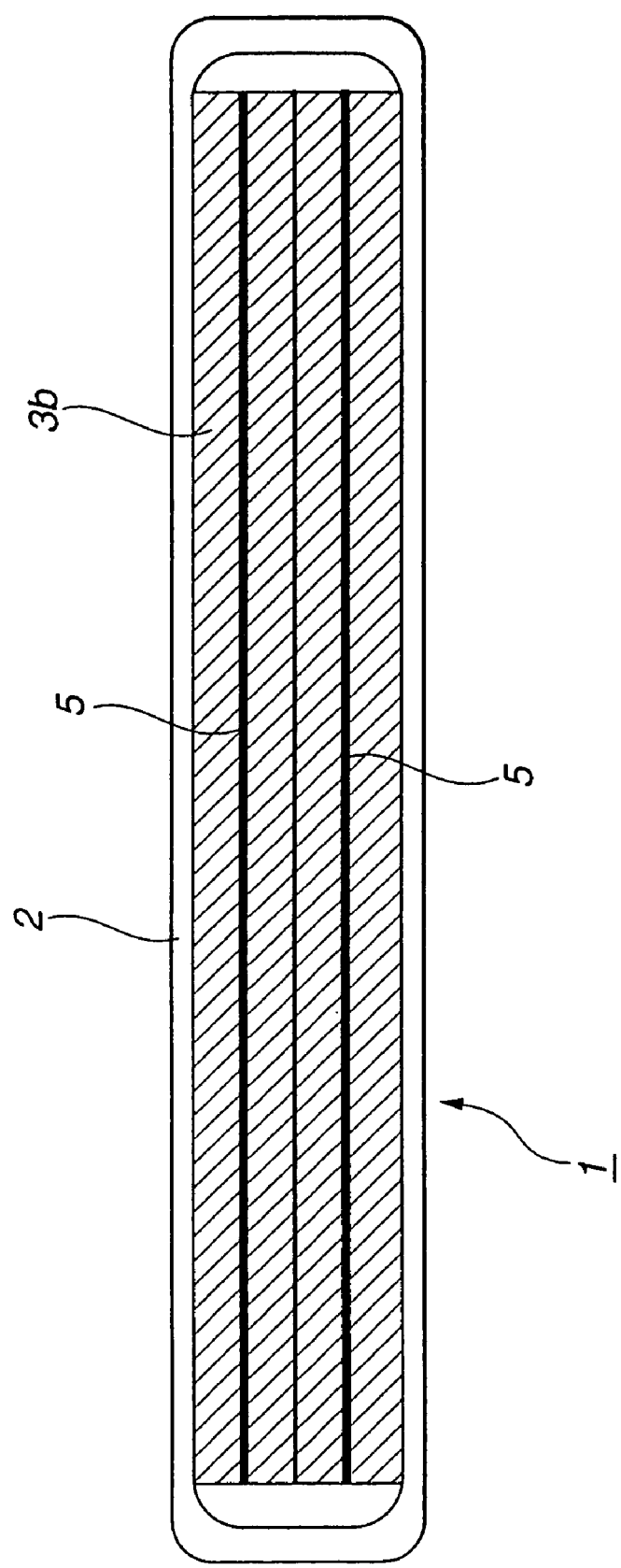
FIG. 4 is a sectional view of the aqueous electrolyte solution absorber according to the present invention when the absorber absorbs liquid to swell.

Now, a second embodiment of the present invention will be described in detail by referring to the drawings. As an aqueous electrolyte solution absorber to which the present invention is applied, an aqueous electrolyte solution absorber 1 as shown in FIGS. 3 and 4 will be described below. As the "aqueous electrolyte solution absorber" described herein, there is exemplified as mentioned above, a member having a function as a sandbag employed for raising an embankment or preventing the collapse of the embankment and restoring it in the overflow of the sea and rivers, or a member having a function for removing unnecessary water, which may include electrolytes, remaining in a water leakage or a flood and so on.

Figure 5:
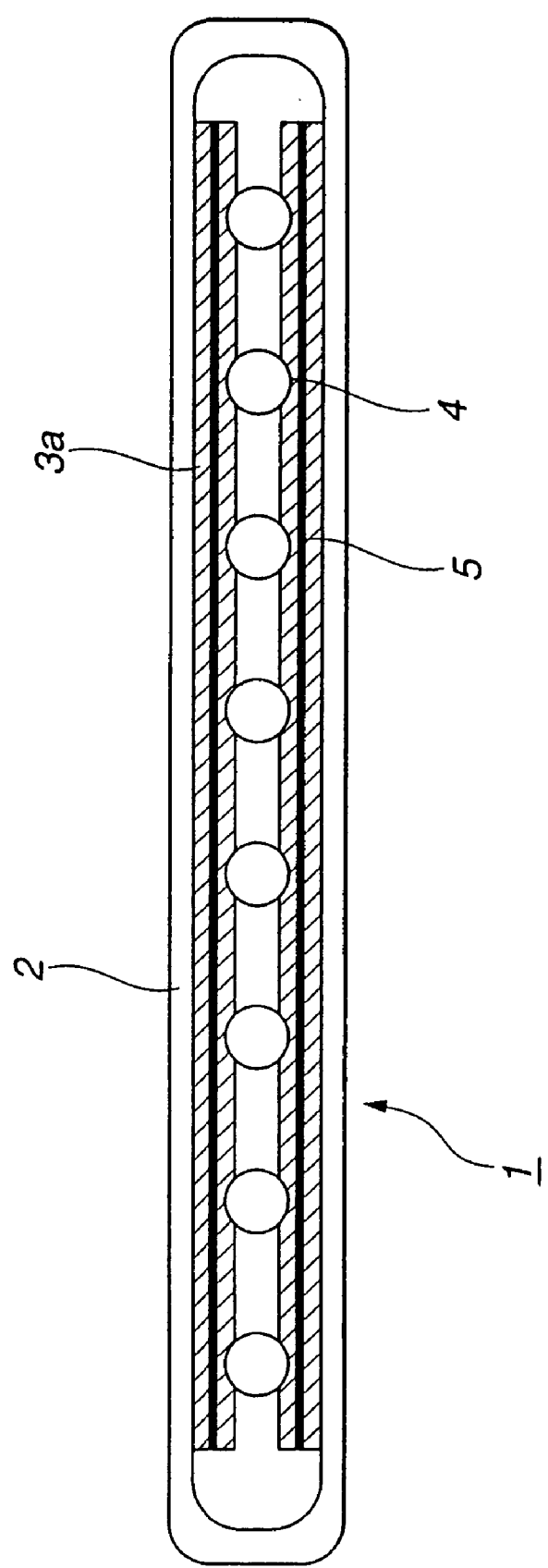
FIG. 5 is a sectional view of an aqueous electrolyte solution absorber according to the present invention including soil and/or a solid material of specific gravity of 1 or higher when the absorber is dried.
Figure 6:
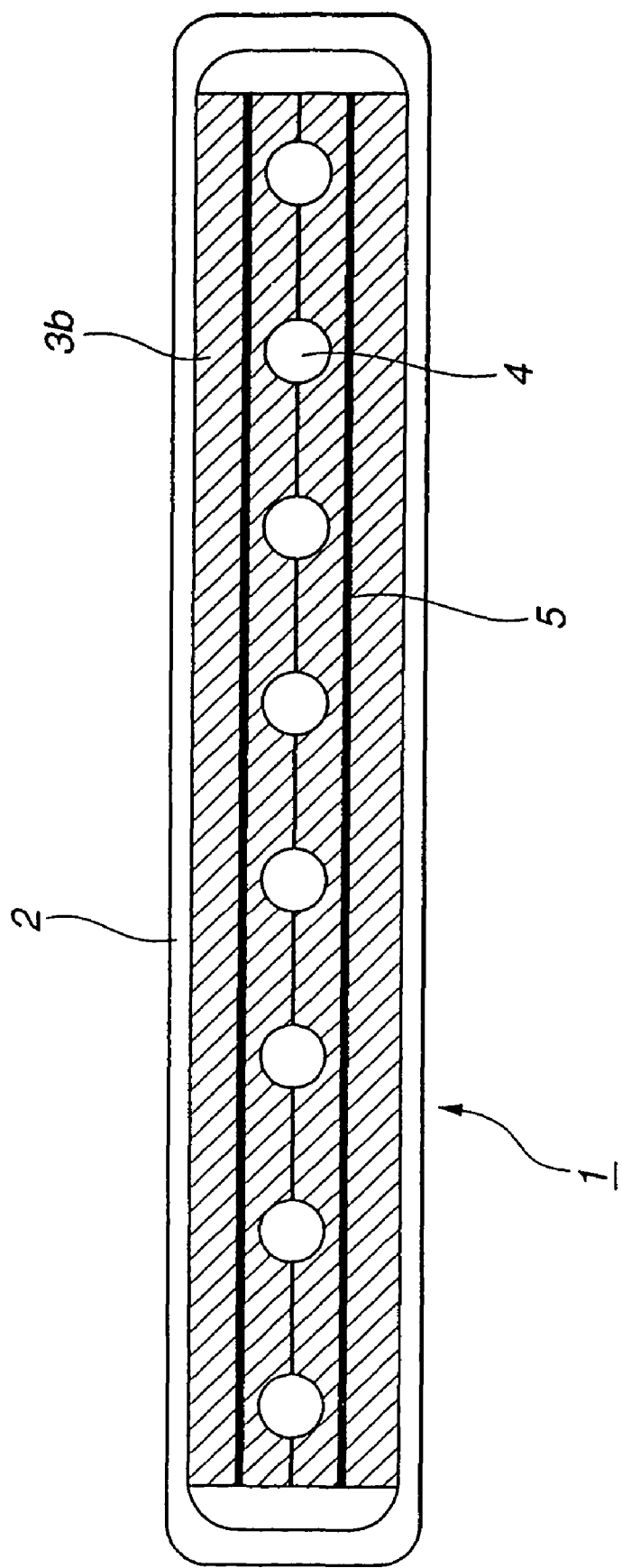
FIG. 6 is a sectional view of the aqueous electrolyte solution absorber according to the present invention including the soil and/or the solid material of specific gravity of 1 or higher when the absorber absorbs liquid to swell.

The aqueous electrolyte solution absorber 1 according to the present invention is provided with a water permeable bag type member 2 and an aqueous electrolyte solution absorbent polymer 3 and supporters 5 contained in the water permeable bag type member 2 as shown in FIGS. 3 and 4. The aqueous electrolyte solution absorber 1 comprises, in its dried state, an aqueous electrolyte solution absorbent polymer 3a under a dried state, the supporters 5 and the water permeable bag type member 2 as shown in the sectional view of FIG. 3, and comprises, in its liquid absorbing and swelling state, an aqueous electrolyte solution absorbent polymer 3b under a liquid absorbing and swelling state, the supporters 5 and the water permeable bag type member 2 as shown in the sectional view of FIG. 4. Further, a sectional view of the aqueous electrolyte solution absorber 1 according to the present invention in which soil or solid materials 4 of specific gravity of 1 or higher are included under its dried state is shown in FIG. 5 and a sectional view of the absorber under a liquid absorbing and swelling state is shown in FIG. 6.

As a material for the water permeable bag type member 2, a cloth composed of natural fibers or synthetic fibers is used. As the natural fibers, for instance, cotton, linen, silk, etc. may be exemplified. As the synthetic fibers, there may be exemplified, polyamide, polyimide, polyester, polyethylene, polypropylene, etc. The material is preferably composed of a cloth formed by independently knitting or weaving these fibers or the mixture of them. However, according to circumstances, the material may be made of a nonwoven fabric. Further, according to circumstances, the material may be composed of a film type member having pores passing through the front and back thereof.

The form or material of the supporter 5 in the present invention which can support the aqueous electrolyte solution absorbent polymer is not especially limited to a specific form or material. Here, the "support" indicates the adhesion or impregnation of modified polymer compounds to prevent the modified polymer compounds from being extremely inclined in the water permeable bag type member 2.

As the supporter, a network member having a flexibility is specifically preferable. As the flexible network member 5, a cloth composed of natural fibers or synthetic fibers is used. As materials of them, the same materials as those of the water permeable bag type member 2 can be used. That is, as natural fibers, for instance, cotton, linen, silk, etc. may be exemplified. As the synthetic fibers, there may be exemplified, polyamide, polyimide, polyester, polyethylene, polypropylene, etc. The material is preferably composed of a cloth formed by independently knitting or weaving these fibers or the mixture of them. However, according to circumstances, the material may be made of a nonwoven fabric or paper. Further, according to circumstances, the material may be composed of a film type member having pores passing through the front and back thereof.

In this case, the supporter 5, preferably, the network member having a flexibility desirably has an occupation rate of through holes higher than that of the water permeable bag type member 2. Accordingly, the aqueous electrolyte solution absorbent polymer is adhered to the supporter or the supporter is impregnated with the aqueous electrolyte solution absorbent polymer, so that the aqueous electrolyte solution absorbent polymer can be fixed to the supporter 5. Thus, when the aqueous electrolyte solution absorber according to the present invention is conveyed and stored, the aqueous electrolyte solution absorbent polymer can be prevented from being biased to get out of shape in the aqueous electrolyte solution absorber. Further, even when the aqueous electrolyte solution absorber is repeatedly used in such a manner that the aqueous electrolyte solution absorber absorbing liquid is used, then dried after using and reused, the aqueous electrolyte solution absorbent polymer can be prevented from being biased to get out of shape in the aqueous electrolyte solution absorber. Thus, the number of times of repeated uses can be advantageously increased.

As a method for fixing the aqueous electrolyte solution absorbent polymer to the supporter in the present invention by adhering the aqueous electrolyte solution absorbent polymer to the supporter or impregnating the supporter with the aqueous electrolyte solution absorbent polymer, may be exemplified a method for applying a water dispersion system of the aqueous electrolyte solution absorbent polymer in a liquid absorbing and swelling state to the supporter to dry it. As another method, may be exemplified a method for applying to the supporter a dispersion system of the aqueous electrolyte solution absorbent polymer in a non-swelling state to organic liquid to dry it. Thus, since the applying and drying operation can be simplified and consumed energy can be reduced, this method is preferably used in the present invention. Further, as a still another method, may be employed a method for impregnating the supporter with water or organic liquid, adhering the aqueous electrolyte solution absorbent polymer in a dried state to the supporter and drying the liquid.

A sheet type member fixed to the supporter by adhering the aqueous electrolyte solution absorbent polymer to the supporter or impregnating the supporter with the aqueous electrolyte solution absorbent polymer in accordance with the above-described methods is obtained by performing a compressing operation with a static pressure press or a roller. In this case, the compressing operation can be carried out at room temperature, and more effectively carried out under a heated state at room temperature or higher.

In the present invention, soil and/or solid materials 4 of specific gravity of 1 or higher can be included in the water permeable bag type member except the aqueous electrolyte solution absorbent polymer. Thus, the aqueous electrolyte solution absorber according to the present invention has an advantage that the absorber is hardly made to flow by water or the like especially during the initial stage of its installation.

As the solid materials 4 of specific gravity of 1 or higher, there may be exemplified a solid material made of natural minerals, a solid material made of waste and a solid material formed by binding the waste. As materials of them, there are exemplified plastic, metal, ceramics, glass, or the mixture of them. For binding them, polymer materials of specific gravity of 1 or lower can be used. The polymer materials used for binding are not especially limited to specific materials. There are enumerated, for example, polystyrene, styrene-propylene copolymer, styrene-butadiene copolymer, styrene-vinyl chloride copolymer, styrene-vinyl acetate copolymer, styrene-acrylic ester copolymer, styrene-methacrylic ester copolymer, polyester resin, polyvinyl alcohol, water soluble resins such as casein, sodium polyacrylate etc., alcohol soluble resins such as copolymer nylon, methoxymethylated nylon etc., curing type resins forming three-dimensional network structures such as polyurethane, melamine resin, epoxy resin, etc.

In the present invention, as the solid materials 4 of specific gravity of 1 or higher, materials having magnetism can be used. The aqueous electrolyte solution absorber according to the present invention can be magnetically attracted and advantageously moved and transported by a crane or the like due to this magnetism. Further, the aqueous electrolyte solution absorber can be identified due to the magnetism.

As the materials having the magnetism, there may be exemplified materials having ferrimagnetism, ferromagnetism or parasitic magnetism. More specifically, as the ferromagnetic materials, there may be exemplified iron, nickel, cobalt or alloys of them, alloys including them, transition metals or alloys of them, and alloys including rare earth elements. Further, the ferrimagnetic materials include magnetite, maghemite, hematite, manganese zinc ferrite, manganese nickel ferrite, barium ferrite, strontium ferrite, etc. These materials may be composed of natural minerals, waste or materials formed by binding the waste. These materials have specific gravity higher than those of ordinary inorganic materials to increase the weight of a sandbag, so that even the sandbag which absorbs liquid can effectively and relatively increase its weight. Further, these materials can be obtained from inductor elements or speakers of used electric devices, or the deflection yokes of televisions. Since these members are hardly treated in the dismantling step of electronic devices, they are serviceable in view of effective use of them.

Consequently, since the aqueous electrolyte solution absorber according to the present invention has an advantage that the aqueous electrolyte solution absorber of the present invention can be applied to a broader range, that is, can absorb more kinds of aqueous electrolyte solutions than a conventional aqueous electrolyte solution absorber.

The aqueous electrolyte solution absorber according to the present invention is low both in weight and volume upon its transportation and absorbs water upon its use so that the absorber of the present invention adequately satisfies a function of a form followability for its weight, volume and outline. Further, the aqueous electrolyte solution absorber rarely gets out of shape during its transportation and storage. The aqueous electrolyte solution absorber according to the present invention can be employed as an excellent substitute for the sandbag due to these features. That is, since the aqueous electrolyte solution absorber can be applied not only to pure water, but also to water including electrolytes such as sea water, waste water, muddy water, etc., the absorber of the present invention can be applied to the raising an embankment in the sea or rivers or the prevention and restoration of the collapse of the embankment, or to the water leakage from factories, especially, to the water leakage from tanks for storing aqueous electrolyte solution in the factories belonging to the field of a battery industry or a plating industry. Thus, the aqueous electrolyte solution absorber of the present invention has an excellent liquid absorptivity and handling characteristics as compared with the conventional sandbag (for instance, a linen bag filled with soil).

Since the aqueous electrolyte solution absorber according to the present invention can be manufactured by employing used polymers or wastes, and solid materials of specific gravity of 1 or higher contained as desired can be also manufactured by using members hardly treated in a dismantling step of electronic devices, these wastes or the like can be effectively reused and accordingly, the absorber of the present invention can advantageously contribute to a global environment and to the provision of an inexpensive product.

Now, a third embodiment of the present invention will be described in detail by referring to the drawings.

As an aqueous electrolyte solution absorber to which the present invention is applied, an aqueous electrolyte solution absorber 1 as shown in FIG. 6 is used. This aqueous electrolyte solution absorber is the same as that described in the second embodiment.

As the "aqueous electrolyte solution absorber" described herein, there is exemplified as mentioned above, a member having a function as a sandbag employed for raising an embankment or preventing the collapse of the embankment and restoring it in the overflow of the sea and rivers, or a member having a function for removing unnecessary water remaining in a water leakage or a flood and so on.

The aqueous electrolyte solution absorber 1 according to the present invention is provided with a water permeable bag type member 2 and an aqueous electrolyte solution absorbent polymer 3 and a magnetic material 4 included in the water permeable bag type member 2. The aqueous electrolyte solution absorber 1 comprises, in its dried state, an aqueous electrolyte solution absorbent polymer 3a under a dried state, the magnetic material 4 and the water permeable bag type member 2 as shown in the sectional view of FIG. 1, and, comprises, in its liquid absorbing and swelling state, an aqueous electrolyte solution absorbent polymer 3b under a liquid absorbing and swelling state, the magnetic member and the water permeable bag type member 2 as shown in the sectional view of FIG. 2. Further, a sectional view of the aqueous electrolyte solution absorber 1 according to the present invention in which the supporter 5 is included under its dried state is shown in FIG. 3 and a sectional view of the absorber under a liquid absorbing and swelling state is shown in FIG. 4.

The aqueous electrolyte solution absorbent polymer used in the present invention is ordinarily produced by introducing a hydrophilic group to the water insoluble polymer. The aqueous electrolyte solution absorbent polymer used as a raw material is not especially limited to a specific material, however, a water insoluble polymer obtained from an inexpensive commodity monomer is preferably employed as a raw material. The above-described commodity water insoluble polymer is described in the first embodiment.

Figure 7:
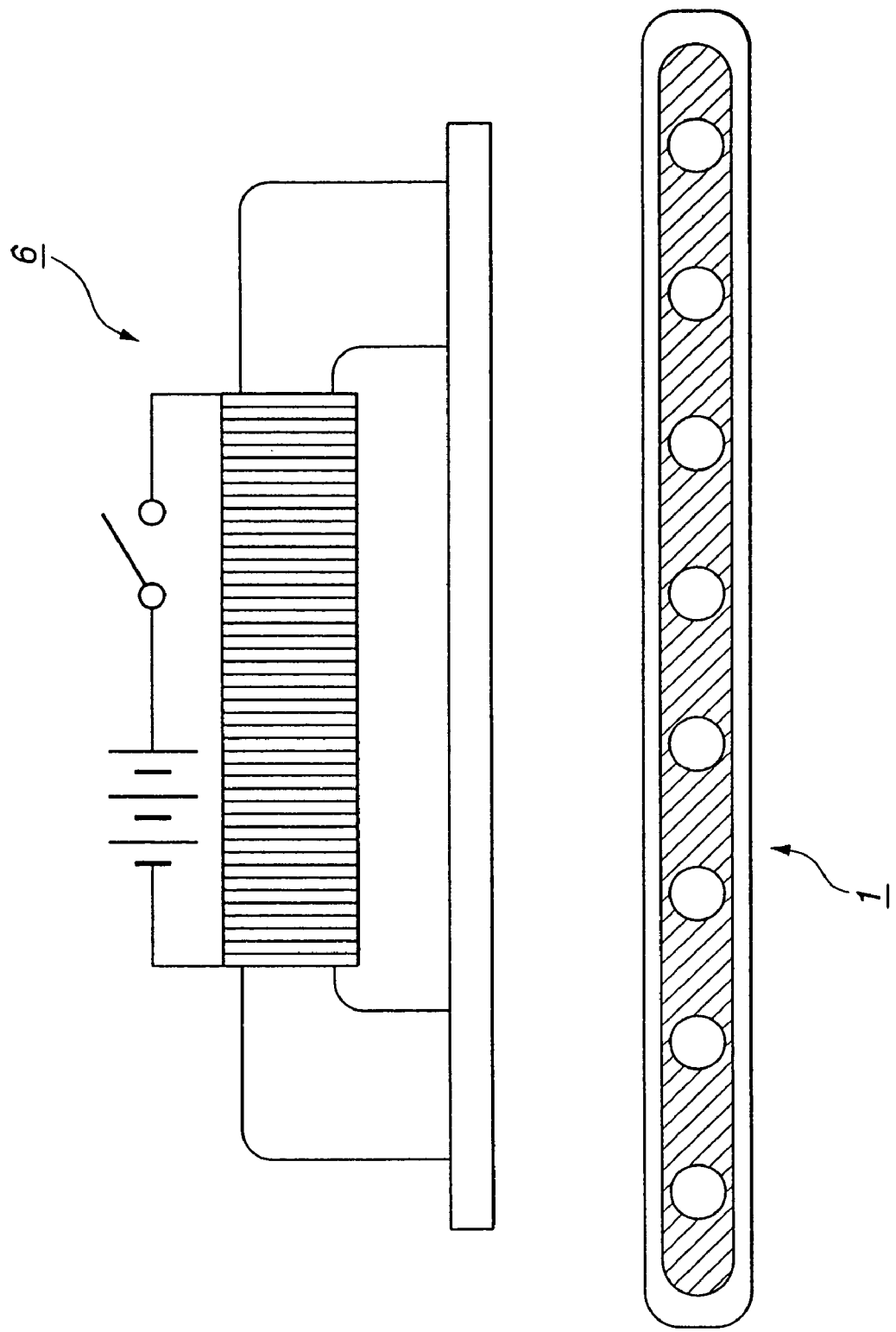
FIG. 7 is a view showing a conveying manner when an aqueous electrolyte solution absorber according to the present invention is magnetically sucked and conveyed.
Figure 8:
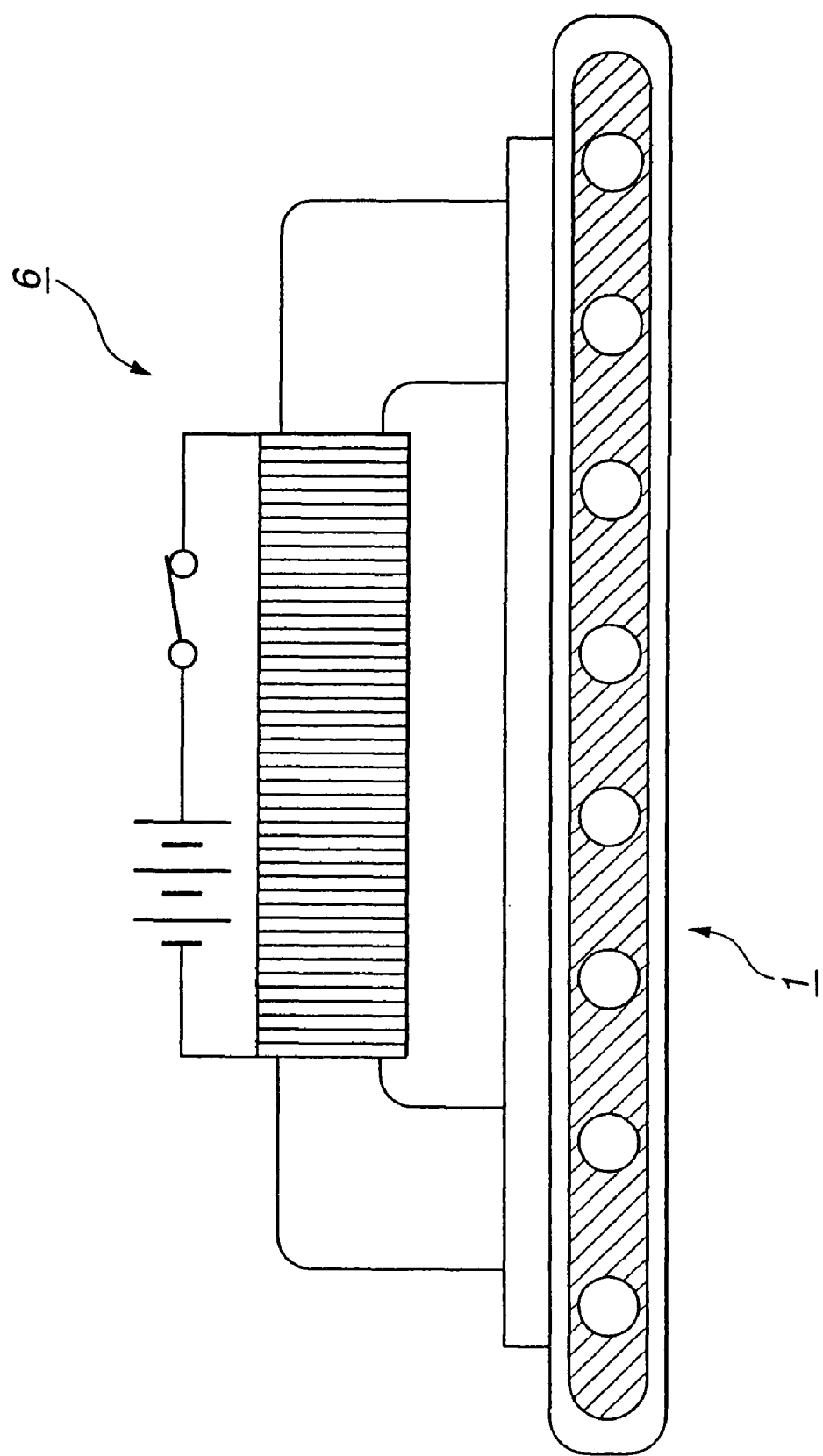
FIG. 8 is a view showing a conveying manner when an aqueous electrolyte solution absorber according to the present invention is magnetically sucked and conveyed.

In the present invention, a material 4 to be sucked is included as well as the aqueous electrolyte solution absorbent polymers 3a and 3b. As the material 4 to be sucked, a magnetic material having magnetism is preferably used. The magnetic materials are included as described above, so that the aqueous electrolyte solution absorber 1 is magnetically sucked by using a magnetic suction means 6 as shown in FIGS. 7 and 8 and moved and conveyed by a conveyor or a crane or the like. Accordingly, the aqueous electrolyte solution absorber can be advantageously conveyed to a risky place for persons to move and rapidly conveyed upon emergency. Further, the aqueous electrolyte solution absorber can be advantageously identified due to the magnetism.

As the materials having the magnetism, there may be exemplified materials having ferrimagnetism, ferromagnetism or parasitic magnetism. More specifically, as the ferromagnetic materials, there may be exemplified iron, nickel, cobalt or alloys of them, alloys including them, transition metals or alloys of them, and alloys including rare earth elements. Further, the ferrimagnetic materials include magnetite, maghemite, hematite, manganese zinc ferrite, manganese nickel ferrite, barium ferrite, strontium ferrite, etc. These materials may be composed of natural minerals, waste or materials formed by binding the waste. More specifically, these materials can be obtained from inductor elements or speakers of used electric devices, or the deflection yokes of televisions. Since these members are hardly treated in the dismantling step of electronic devices, they are serviceable in view of effective use of them. Further, a technique for obtaining the ferrite using used dry cells is developed, which can be effectively adapted to the present invention from the above described point of view. These magnetic materials have specific gravity larger than those of ordinary inorganic materials to increase the weight of the aqueous electrolyte solution absorber, so that even the aqueous electrolyte solution absorber which absorbs aqueous electrolyte solution effectively and relatively increases its weight.

As a material for the water permeable bag type member 2, a cloth composed of natural fibers or synthetic fibers is used. As the natural fibers, for instance, cotton, linen, silk, etc. may be exemplified. As the synthetic fibers, there may be exemplified, polyamide, polyimide, polyester, polyethylene, polypropylene, etc. The material is preferably composed of a cloth formed by independently knitting or weaving these fibers or the mixture of them. However, according to circumstances, the material may be made of a nonwoven fabric. Further, according to circumstances, the material may be composed of a film type member having pores passing through the front and back thereof.

In the present invention, a supporter may be included in the water permeable bag type member 2 as well as the aqueous electrolyte solution absorbent polymer and the magnetic materials.

The form or material of the supporter 5 in the present invention which can support the aqueous electrolyte solution absorbent polymer is not especially limited to a specific form or material. Here, the "support" indicates the adhesion or impregnation of modified polymer compounds to prevent the modified polymer compounds from being extremely inclined in the water permeable bag type member 2. As the supporter, a network member having a flexibility is specifically preferable. As the flexible network member 5, a cloth composed of natural fibers or synthetic fibers is used. As materials of them, the same materials as those of the water permeable bag type member 2 can be used. That is, as natural fibers, for instance, cotton, linen, silk, etc. may be exemplified. As the synthetic fibers, there may be exemplified, polyamide, polyimide, polyester, polyethylene, polypropylene, etc. The material is preferably composed of a cloth formed by independently knitting or weaving these fibers or the mixture of them. However, according to circumstances, the material may be made of a nonwoven fabric or paper. Further, according to circumstances, the material may be composed of a film type member having pores passing through the front and back thereof.

In this case, the supporter 5, preferably, the network member having a flexibility desirably has an occupation rate of through holes higher than that of the water permeable bag type member 2. Accordingly, the aqueous electrolyte solution absorbent polymer is adhered to the supporter or the supporter is impregnated with the aqueous electrolyte solution absorbent polymer, so that the aqueous electrolyte solution absorbent polymer can be fixed to the supporter. Thus, when the aqueous electrolyte solution absorber according to the present invention is conveyed and stored, the aqueous electrolyte solution absorbent polymer can be prevented from being biased to get out of shape in the aqueous electrolyte solution absorber. Further, even when the aqueous electrolyte solution absorber is repeatedly used in such a manner that the aqueous electrolyte solution absorber absorbing liquid is used, then dried after using and reused, the aqueous electrolyte solution absorbent polymer can be prevented from being biased to get out of shape in the aqueous electrolyte solution absorber. Thus, the number of times of repeated uses can be advantageously increased.

As a method for fixing the aqueous electrolyte solution absorbent polymer to the supporter in the present invention by adhering the aqueous electrolyte solution absorbent polymer to the supporter or impregnating the supporter with the aqueous electrolyte solution absorbent polymer, may be exemplified a method for applying a water dispersion system of the aqueous electrolyte solution absorbent polymer in a liquid absorbing and swelling state to the supporter to dry it. As another method, may be exemplified a method for applying to the supporter a dispersion system of the aqueous electrolyte solution absorbent polymer in a non-swelling state to organic liquid to dry it. Thus, since the applying and drying operation can be simplified and consumed energy can be reduced, this method is preferably used in the present invention. Further, as a still another method, may be employed a method for impregnating the supporter with water or organic liquid, adhering the aqueous electrolyte solution absorbent polymer in a dried state to the supporter and drying the liquid.

A sheet type member fixed to the supporter by adhering the aqueous electrolyte solution absorbent polymer to the supporter or impregnating the supporter with the aqueous electrolyte solution absorbent polymer in accordance with the above-described methods is obtained by performing a compressing operation with a static pressure press or a roller. In this case, the compressing operation can be carried out at room temperature, and more effectively carried out under a heated state at room temperature or higher.

In the present invention, soil and/or solid materials of specific gravity of 1 or higher can be included in the water permeable bag type member except the aqueous electrolyte solution absorbent polymer. Thus, the aqueous electrolyte solution absorber according to the present invention has an advantage that the absorber is hardly made to flow by water or the like especially during the initial stage of its installation.

As the solid materials of specific gravity of 1 or higher, there may be exemplified a solid material made of natural minerals, a solid material made of waste and a solid material formed by binding the waste. As materials of them, there are exemplified plastic, metal, ceramics, glass, or the mixture of them. For binding them, polymer materials of specific gravity of 1 or lower can be used. The polymer materials used for binding are not especially limited to specific materials. There are enumerated, for example, polystyrene, styrene-propylene copolymer, styrene-butadiene copolymer, styrene-vinyl chloride copolymer, styrene-vinyl acetate copolymer, styrene-acrylic ester copolymer, styrene-methacrylic ester copolymer, polyester resin, polyvinyl alcohol, water soluble resins such as casein, sodium polyacrylate etc., alcohol soluble resins such as copolymer nylon, methoxymethylated nylon etc., curing type resins forming three-dimensional network structures such as polyurethane, melamine resin, epoxy resin, etc.

Consequently, since the aqueous electrolyte solution absorber according to the present invention is low both in weight and volume upon its transportation and includes the materials to be sucked, a large amount of absorbers can be rapidly transported by magnetically sucking them through suction means corresponding to the materials to be sucked, for instance, when the materials to be sucked are magnetic materials. On the other hand, the aqueous electrolyte solution absorber absorbs water upon its use to adequately satisfy a function of a form followability for weight, volume and outline. The aqueous electrolyte solution absorber according to the present invention can be employed as an excellent substitute for the sandbag due to these features. That is, since the absorber can be applied not only to pure water, but also to water including electrolytes such as sea water, waste water, muddy water, etc., the absorber of the present invention can be applied to the raising an embankment in the sea or rivers or the prevention and restoration of the collapse of the embankment, or to the water leakage from factories, especially, to the water leakage from tanks for storing aqueous electrolyte solution in the factories belonging to the field of a battery industry or a plating industry. Thus, the aqueous electrolyte solution absorber of the present invention has an excellent liquid absorptivity and handling characteristics as compared with the conventional sandbag (for instance, a linen bag filled with soil).

The aqueous electrolyte solution absorber according to the present invention advantageously has an applicable range wider than that of the conventional aqueous electrolyte solution absorber, that is, is capable of absorbing many kinds of aqueous electrolyte solutions.

Since the aqueous electrolyte solution absorber according to the present invention can be manufactured by employing used polymers or wastes, and the solid materials of specific gravity of 1 or higher contained as desired can be manufactured by using members hardly treated in a dismantling step of electronic devices, these wastes or the like can be effectively reused and accordingly, the absorber of the present invention can advantageously contribute to an global environment and to the provision of inexpensive products.

Now, a method for conveying an aqueous electrolyte solution absorber according to a fourth embodiment, wherein the aqueous electrolyte solution absorber including an aqueous electrolyte solution absorbent polymer and materials to be sucked in a water permeable bag type member is sucked. More specifically, there is exemplified as a preferred embodiment, a method for magnetically sucking and conveying the aqueous electrolyte solution absorber 1 by using magnetic materials having magnetism illustrated as the materials 4 to be sucked in the embodiments 1 to 3 and a magnetic suction means 6 shown in FIGS. 7 and 8.

As mentioned above, the absorber is sucked and conveyed by employing the materials to be sucked, so that a large amount of absorbers can be moved and conveyed at a time by, for instance, a conveyor, a crane, etc. Thus, the absorbers can be transported to a risky place where persons must go with danger and can be rapidly transported upon emergency. Further, when magnetic materials are used as the materials 4 to be sucked, the aqueous electrolyte solution absorber can be advantageously identified due to its magnetism.

Now, an aqueous electrolyte solution absorber suitable for the conveying method of the present invention will be described by referring to the drawings. As the aqueous electrolyte solution absorber to which the present invention is applied, the aqueous electrolyte solution absorber 1 as shown in FIGS. 3 to 6 is employed.

The aqueous electrolyte solution absorber 1 according to the present invention comprises a water permeable bag type member 2, an aqueous electrolyte solution absorbent polymer 3 and magnetic materials 4 included in the water permeable bag type member 2. The aqueous electrolyte solution absorber 1 is the same as those shown in the first to third embodiments.

As a result, according to the conveying method according to the present invention, a large amount of aqueous electrolyte solution absorbers can be rapidly conveyed at a time even to a risky place where the persons need to convey the absorbers with danger.

INDUSTRIAL APPLICABILITY

The aqueous electrolyte solution absorber provided in the present invention is suitable for the above-described conveying method. In other words, the aqueous electrolyte solution absorber is low both in weight and volume upon its transportation and absorbs water upon its use so that the absorber of the present invention adequately satisfies a function of a form followability for its weight, volume and outline. Further, the aqueous electrolyte solution absorber of the present invention can be advantageously applied to a broader range than that of a conventional aqueous electrolyte solution absorber, that is, the absorber of the present invention can absorb many kinds of aqueous electrolyte solutions.

The aqueous electrolyte solution absorber according to the present invention can be employed as an excellent substitute for a sandbag due to these features. That is, since the aqueous electrolyte solution absorber can be applied not only to pure water, but also to water including electrolytes such as sea water, waste water, muddy water, etc., the absorber of the present invention can be applied to the raising an embankment in the seaside or the prevention and restoration of the collapse of the embankment, or to the water leakage from factories, especially, to the water leakage from tanks for storing aqueous electrolyte solution in the factories belonging to the field of a battery industry or a plating industry. Thus, the aqueous electrolyte solution absorber of the present invention has an excellent liquid absorptivity and transportation characteristics (facility in transportation) as compared with the conventional sandbag (for instance, a linen bag filled with soil).

Since the aqueous electrolyte solution absorber according to the present invention can be manufactured by employing used polymers or wastes, and solid materials of specific gravity of 1 or higher contained as desired can be also manufactured by using members hardly treated in a dismantling step of electronic devices, these wastes or the like can be effectively reused and accordingly, the absorber of the present invention can advantageously contribute to a global environment and to the provision of an inexpensive product.

The invention claimed is:

1. A method for producing an aqueous electrolyte solution absorber comprising the steps of:
    placing, in a water permeable unit, (1) at least two layers of an aqueous electrolyte solution absorbent polymer obtained by introducing a hydrophilic group to a water insoluble polymer including at least one or more kinds of aromatic rings and/or conjugated dienes in a principal chain and/or a side chain, and (2) a solid material spacer in-between the layers of aqueous electrolyte solution absorbent polymer effective to create a space in-between the layers of the aqueous electrolyte solution absorbent polymer; and
    absorbing a liquid with the aqueous eletrolyte solution adsorbent polymer causing the aqueous electrolyte solution absorbent polymer to swell and thereby reducing the space in-between the layers of the aqueous electrolyte solution absorbent polymer created by the solid material spacer,
    wherein,
        a flexible network support member is located within each layer of aqueous electrolyte absorbent polymer, the flexible network support member effective to support the aqueous electrolyte absorbent polymer.

2. The method for producing an aqueous electrolyte solution absorber according to claim 1, wherein the hydrophilic polar group includes at least one or more kinds of hydrophilic polar groups selected from a group having a sulfonic group which may form salts, a sulfate group which may form salts, a carboxyl group which may form salts, an amide group, a nitro group, a —$PO(OH)_2$ group which may form salts, a —$OPO(OH)_2$ group which may form salts, a hydroxyl group which may form salts, and an amine base which may form salts.

3. The method for producing an aqueous electrolyte solution absorber according to claim 1, wherein the hydrophilic polar group of 0.1 to 99 mole % is included based on total monomer units of the water insoluble polymer.

4. The method for producing an aqueous electrolyte solution absorber according to claim 1, wherein at least one or more kinds of aromatic rings and/or conjugated dienes of 1 to 100 mole % in the water insoluble polymer are included based on total monomer units of the water insoluble polymer.

5. An aqueous electrolyte solution according to claim 1, wherein the solid material spacer has a specific gravity of 1 or higher.

6. An aqueous electrolyte solution according to claim 1, wherein the aqueous electrolyte solution includes a magnetic solid material.

* * * * *